(12) United States Patent
Kimura

(10) Patent No.: US 9,181,417 B2
(45) Date of Patent: Nov. 10, 2015

(54) RUBBER COMPOSITION

(75) Inventor: Shigeo Kimura, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 14/236,222

(22) PCT Filed: Aug. 1, 2012

(86) PCT No.: PCT/JP2012/069615
§ 371 (c)(1),
(2), (4) Date: Jan. 30, 2014

(87) PCT Pub. No.: WO2013/018838
PCT Pub. Date: Feb. 7, 2013

(65) Prior Publication Data
US 2014/0166175 A1    Jun. 19, 2014

(30) Foreign Application Priority Data
Aug. 2, 2011   (JP) .................................. 2011-169054

(51) Int. Cl.
| | | |
|---|---|---|
| C08K 5/00 | (2006.01) | |
| B60C 5/00 | (2006.01) | |
| C08K 5/16 | (2006.01) | |
| B60C 11/02 | (2006.01) | |
| B60C 1/00 | (2006.01) | |
| C08K 5/29 | (2006.01) | |
| C08K 5/39 | (2006.01) | |
| C08K 5/40 | (2006.01) | |
| C08K 5/47 | (2006.01) | |
| B29D 30/56 | (2006.01) | |
| B60C 11/00 | (2006.01) | |
| C08K 5/3472 | (2006.01) | |

(52) U.S. Cl.
CPC . *C08K 5/16* (2013.01); *B29D 30/56* (2013.01); *B60C 1/00* (2013.01); *B60C 1/0016* (2013.04); *B60C 11/0008* (2013.01); *B60C 11/02* (2013.01); *C08K 5/0025* (2013.01); *C08K 5/29* (2013.01); *C08K 5/3472* (2013.01); *C08K 5/39* (2013.01); *C08K 5/40* (2013.01); *C08K 5/47* (2013.01); *B60C 2001/0075* (2013.04); *Y10T 152/10495* (2015.01)

(58) Field of Classification Search
USPC .......................................................... 524/236
See application file for complete search history.

(56) References Cited

U.S. PATENT DOCUMENTS

2002/0180078 A1    12/2002    Chauvin et al.
2005/0224150 A1*   10/2005    Suzuki ....................... 152/209.6

FOREIGN PATENT DOCUMENTS

| EP | 0442426 | A2 | 8/1991 | |
|---|---|---|---|---|
| JP | 6-256572 | A | 9/1994 | |
| JP | 6-256603 | A | 9/1994 | |
| JP | 06256572 | A * | 9/1994 | ............... C08L 9/02 |
| JP | 06256603 | A * | 9/1994 | ............. C08L 23/16 |
| JP | 8-59898 | A | 3/1996 | |
| JP | 2002-356102 | A | 12/2002 | |
| JP | 2004-43640 | A | 2/2004 | |
| JP | 2009-108117 | A | 5/2009 | |

OTHER PUBLICATIONS

Translation of JP 06-256572, Sep. 13, 1994.*
Translation of JP 06-256603, Sep. 13, 1994.*
International Search Report for PCT/JP2012/069615 dated Nov. 20, 2012.
International Preliminary Report on Patentability and Written Opinion issued Feb. 13, 2014 in International Application No. PCT/JP2012/069615.
Communication dated Dec. 8, 2014, issued by the European Patent Office in counterpart European application No. 12820292.6.

* cited by examiner

*Primary Examiner* — Hui Chin
(74) *Attorney, Agent, or Firm* — Sughrue Mion, PLLC

(57) ABSTRACT

Provided are a rubber composition suitable for cushion rubbers of retreaded tires in which tread rubbers of tires such as truck and bus tires (TBR) and aircraft tires are replaced for reuse, and a rubber composition which is suitable for adhesion carried out by interposing the rubber composition between vulcanized rubber members and covulcanizing them in a tire prepared by adhering separately vulcanized rubber members and which is excellent in a productivity. The rubber composition is characterized by comprising 0.3 to 2.5 parts by mass of aldehydeamines, 0.1 to 1.5 part by mass of at least one compound selected from a group consisting of tetra(2-ethylhexyl)thiuram disulfide, 1,6-bis(N,N'-dibenzylthiocarbamoyldithio)-hexane and 1,6-bis{N,N'-di(2-ethylhexyl)thiocarbamoyldithio}-hexane, and 0.1 to 2.5 parts by mass of a thiazole type vulcanization accelerator based on 100 parts by mass of a rubber component.

5 Claims, No Drawings

RUBBER COMPOSITION

CROSS REFERENCE TO RELATED APPLICATIONS

This application is a National Stage of International Application No. PCT/JP2012/069615 filed Aug. 1, 2012, claiming priority based on Japanese Patent Application No. 2011-169054 filed Aug. 2, 2011, the contents of all of which are incorporated herein by reference in their entirety.

TECHNICAL FIELD

The present invention relates to a rubber composition suitable for cushion rubbers of tires retreaded by using particularly a pre-cure tread (PCT) retreading method for adhering a vulcanized pre-cure tread rubber onto a buffed tire casing via an unvulcanized cushion rubber, wherein retreaded tires are produced and reused by replacing tread rubbers of pneumatic tires such as truck and bus tires (TBR) and aircraft tires in which tread rubbers are worn down. Further, the present invention relates to a rubber composition suitable for adhesion carried out by interposing the unvulcanized rubber between vulcanized rubber members and covulcanizing rubber members in a tire prepared by adhering separately vulcanized rubber members.

BACKGROUND ART

In the production of retreaded tires of truck and bus radial tires, a method in which the tread surfaces of tires (hereinafter referred to as tire casing) worn down to reach the end of a primary life are buffed and in which retreaded tread rubber parts (pre-cured treads) vulcanized in advance are stuck thereon has so far been known as one of typical methods. The above method is called in the name of a cold method or a pre-cure method, and the method is distinguished from a hot method in which an unvulcanized tread rubber is put on a tire casing and in which the tire is subjected to mold vulcanization.

In the pre-cure method described above, usually carried out is a method in which an unvulcanized cushion rubber is first stuck on a tire casing in order to adhere a pre-cured tread to the tire casing and in which the pre-cured tread is then stuck thereon and heated at a temperature of 100 to 140° C. in a vulcanization oven.

The cushion rubber used in the above method is provided with a function in which the cushion rubber flows into buffed grain of a tire casing to smoothen the adhesion surfaces and in which the cushion rubber is covulcanized with both of the tire casing and the pre-cured tread to thereby secure an adhesive property between the tire casing and the pre-cured tread.

The above cushion rubber has to be provided with a high cross-linking degree by vulcanization in a relatively low temperature range (close to 100° C.), and the cushion rubber is preferred to have a fast vulcanization speed close to 100° C. in order to enhance vulcanization productivity. On the other hand, in a certain case, the cushion rubber is stuck on the tire casing in a state in which the cushion rubber is rolled in advance into a sheet form, and the cushion rubber is coated directly on the tire casing in another case by means of an extruding equipment. In either of the rolling or extruding steps, the temperature is elevated up to 70 to 100° C., and therefore if the vulcanization proceeds in the rolling or extruding steps, it becomes impossible to covulcanize the interface. Accordingly, the longer scorch time is preferable so that the vulcanization does not proceed for some extent of period at a temperature close to 100° C. That is, having antinomies, high Fmax value of a vulcanization maximum torque which indicates a high cross-linking degree at a temperature close to 100° C. and slow vulcanizing rate at T0.1, at which curing the rubber is initiated (longer time) in contrast to fast vulcanizing rate at T0.9 which is the terminal stage for the vulcanization of the rubber (shorter time) have to be made highly compatible with each other.

Known as a rubber composition suitable for a cushion rubber which is required to provide the above properties are, for example, (1) tires characterized by using a rubber composition prepared by blending a specific thiuram compound, a compound such as dibenzothiazyldisulfide, and a compound such as amines as cushion rubbers (refer to, for example, patent document 1 filed by the present applicant), and (2) a rubber composition prepared by blending a vulcanization accelerator such as benzothiazyldisulfide a vulcanization ultra-accelerator such as tetrabenzylthiuram disulfide, and an amine activator for curing (refer to, for example, patent document 2).

In the art of patent document 1 described above, it is prescribed that at least one compound selected from amines, guanidines, aldehydeamines, and aldehydeammonias is added as the amines and the like described above in an amount of 0.1 to 2.0 parts by weight, however, a superiority of the aldehyde amines among the above amines and the like is not referred therein. In addition, a preferable blending amount range thereof is small, and the blended components are different from those in the present invention.

In the art of patent document 2 described above, a vulcanization accelerator such as benzothiazyldisulfide is used in combination with an amine activator for curing. Relating to the vulcanization ultra-accelerator such as tetrabenzylthiuram disulfide, only the group consisting of tetrabenzylthiuram disulfide and zinc dibenzyldithiocarbamate is prescribed, and other compounds containing no carcinogenic nitrosoamine precursors are neither described nor indicated at all. Thus, a rubber composition in which having antinomies, high cross-linking degree at a temperature close to 100° C. and slow vulcanizing rate at T0.1, at which curing the rubber is initiated (longer time) in contrast to fast vulcanizing rate at T0.9 (shorter time) are made highly compatible with each other and which is excellent in a productivity has not yet been obtained in the present circumstances.

Further, a satisfactory rubber composition has not yet been obtained as well in tires produced by interposing a rubber composition for adhesion between separately vulcanized rubber members and covulcanizing in the present situation.

CONVENTIONAL ART DOCUMENTS

Patent Documents

Patent document 1: JP 2002-356102A (Claims, Examples, and others)
Patent document 2: JP 1996-59898A (Claims, Examples, and others)

DISCLOSURE OF THE INVENTION

Problems to be Solved by Invention

In light of the problems and the existing situations each described above, the present invention intends to solve them, and an object thereof is to provide a rubber composition which has a high cross-linking degree at a temperature close to 100° C. and is reduced in a vulcanizing time and excellent in a scorch resistance (prevention of curing caused by heating in processing) and which is suitable for a cushion rubber of a retreaded tire, and a rubber composition which is suitable for adhesion carried out by interposing the rubber composition between vulcanized rubber members and covulcanizing rubber members in a tire prepared by adhering separately vulcanized rubber members.

Means for Solving Problem

Intense investigations repeated by the present inventors on the conventional problems described above have resulted in finding that a rubber composition which meets the object described above can be obtained by suitably combining specific vulcanization accelerators with 100 parts by mass of a rubber component and controlling the respective contents thereof to specific ranges, and thus the present invention has been completed.

That is, the present invention resides in the following items (1) to (5).
(1) A rubber composition comprising 0.3 to 2.5 parts by mass of aldehydeamines, 0.1 to 1.5 part by mass of at least one compound selected from a group consisting of tetra(2-ethylhexyl)thiuram disulfide, 1,6-bis(N,N'-dibenzylthiocarbamoyldithio)-hexane and 1,6-bis{N,N'-di(2-ethylhexyl)thiocarbamoyldithio}-hexane, and 0.1 to 2.5 parts by mass of a thiazole type vulcanization accelerator based on 100 parts by mass of a rubber component.
(2) The rubber composition as described in the above item (1), wherein the rubber composition is vulcanized at a vulcanizing temperature of 120° C. or lower.
(3) The rubber composition as described in the above item (1) or (2), wherein the rubber composition is a cushion rubber of a retreaded tire.
(4) A tire produced by using the rubber composition as described in any one of the above items (1) to (3) for a cushion rubber of a retreaded tire.
(5) A pneumatic tire produced by interposing the rubber composition as described in any one of the above items (1) to (3) between vulcanized rubber members and covulcanizing rubber members to thereby adhere rubber members.

Effect of the Invention

According to the present invention, provided is a rubber composition suitable for a cushion rubber of a retreaded tire which is excellent in a productivity because of a high cross-linking degree at a temperature close to 100° C., a reduction in a vulcanizing time and a scorch resistance (prevention of curing caused by heating in processing) and suitable for a tire prepared by adhering separately vulcanized rubber members.

Further, the rubber composition described above is used for a cushion rubber of a retreaded tire in the present invention, whereby the retreaded tire can be improved in a productivity without damaging the tire performances thereof.

EMBODIMENT FOR CARRYING OUT THE INVENTION

The embodiment of the present invention shall be explained below in detail.

The rubber composition of the present invention is characterized by comprising 0.3 to 2.5 parts by mass of aldehydeamines, 0.1 to 1.5 part by mass of at least one compound selected from a group consisting of tetra(2-ethylhexyl)thiuram disulfide, 1,6-bis(N,N'-dibenzylthiocarbamoyldithio)-hexane and 1,6-bis{N,N'-di(2-ethylhexyl)thiocarbamoyldithio}-hexane, and 0.1 to 2.5 parts by mass of a thiazole type vulcanization accelerator based on 100 parts by mass of a rubber component.

Natural rubbers, diene base synthetic rubbers and the like can be used as the rubber component used in the present invention.

A natural rubber and/or a synthetic polyisoprene rubber are contained in a range of preferably 60 to 100 parts by mass, more preferably 80 to 100 parts by mass based on 100 parts by mass of the rubber component. Rubber components other than the natural rubber and/or the synthetic polyisoprene rubber shall not specifically be restricted and are preferably diene base synthetic rubbers such as SBR and BR.

When the rubber composition suitably is applied to a cushion rubber of a retreaded tire by a pre-cure method in the present invention, or the rubber composition for adhesion which is suitably applied to a tire prepared by adhering separately vulcanized rubber members, a content of the natural rubber and/or the synthetic polyisoprene rubber is set preferably to 60 parts by mass or more from the viewpoints of not reducing an interfacial adhesive property and obtaining a cushion rubber and a rubber for adhesion each having a high strength.

Three kinds compounds of the aldehydeamines, at least one compound selected from tetra(2-ethylhexyl)thiuram disulfide, 1,6-bis(N,N'-dibenzylthiocarbamoyldithio)-hexane and 1,6-bis{N,N'-di(2-ethylhexyl)thiocarbamoyldithio}-hexane, and the thiazole type compounds which are used in the present invention are used as the vulcanization accelerator.

The aldehydeamines include, for example, at least one of n-butylaldehyde-aniline condensation products, butylaldehyde-acetaldehyde-butylideneaniline reaction products, butylaldehyde-monobutylamine condensation products, butylaldehyde-butylideneaniline reaction products, heptaldehyde-aniline reaction products, α-ethyl-β-propylacrolein-aniline condensation products and the like. The n-butylaldehyde-aniline condensation products are preferably used in terms of availability.

Among the thiuram base vulcanization accelerators, at least one compound selected from tetra(2-ethylhexyl)thiuram disulfide, 1,6-bis(N,N'-dibenzylthiocarbamoyldithio)-hexane and 1,6-bis{N,N'-di(2-ethylhexyl)thiocarbamoyldithio}-hexane is used in the present invention, and in the cases of such as tetramethylthiuram disulfide (TMTD) and tetramethylthiuram monosulfide (TMTD) which are thiuram compounds other than the above compounds, they contain a carcinogenic nitrosoamine precursor and cannot exert the effects of the present invention.

The thiazole type vulcanization accelerator includes, for example, at least one of mercaptobenzothiazole (M) and dibenzothiazyldisulfide (DM). Dibenzothiazyldisulfide (DM) is preferably used in terms of exerting further the effects of the present invention.

In the present invention, the respective contents of three kinds of the vulcanization accelerators described above fall in the ranges of 0.3 to 2.5 parts by mass in a case of the aldehydeamines, 0.1 to 1.5 part by mass in a case of at least one compound selected from tetra(2-ethylhexyl)thiuram disulfide, 1,6-bis(N,N'-dibenzylthiocarbamoyldithio)-hexane and 1,6-bis{N,N'-di(2-ethylhexyl)thiocarbamoyldithio}-hexane, and 0.1 to 2.5 parts by mass in a case of the thiazole type vulcanization accelerator based on 100 parts by mass of the rubber component.

If the contents of the aldehydeamines, at least one compound selected from tetra(2-ethylhexyl)thiuram disulfide, 1,6-bis(N,N'-dibenzylthiocarbamoyldithio)-hexane and 1,6- bis{N,N'-di(2-ethylhexyl)thiocarbamoyldithio}-hexane, and the thiazole type vulcanization accelerator are less than 0.3, 0.1 and 0.1 part by mass which are the respective lower limits, the cross-linking degree Fmax or the vulcanizing rate at T0.9 is reduced. On the other hand, if the contents of the aldehydeamines, at least one compound selected from tetra(2-ethylhexyl)thiuram disulfide, 1,6-bis(N,N'-dibenzylthiocarbamoyldithio)-hexane and 1,6-bis{N,N'-di(2-ethylhexyl)thiocarbamoyldithio}-hexane, and the thiazole type vulcanization accelerator exceed 2.5, 1.5 and 2.5 parts by mass which are the respective upper limits, brought about are the problems that not only the vulcanizing rate at T0.9 is increased (the value is reduced), but also the vulcanizing rate at T0.1 is accelerated as well too much (the value is reduced) and that the scorch resistance is deteriorated.

From the viewpoint of causing the high cross-linking degree at a temperature close to 100° C., a reduction in the vulcanizing time and the scorch resistance to be further highly compatible with each other by exerting the good cross-linking degree Fmax, the suitable vulcanizing rate at T0.9 and vulcanizing rate at T0.1, a content of the aldehydeamines is preferably 0.5 to 2.0 parts by mass, more preferably 0.5 to 1.5 part by mass; a content of the at least one compound selected from tetra(2-ethylhexyl)thiuram disulfide, 1,6-bis(N,N'-dibenzylthiocarbamoyldithio)-hexane and 1,6-bis{N,N'-di(2-ethylhexyl)thiocarbamoyldithio}-hexane is preferably 0.1 to 1.0 part by mass, more preferably 0.2 to 1.0 part by mass; and a content of the thiazole type vulcanization accelerator is preferably 0.5 to 2.0 parts by mass, more preferably 0.5 to 1.5 part by mass.

The rubber composition of the present invention can suitably contain, in addition to the respective vulcanization accelerators and the rubber component each described above, a vulcanizing agent such as sulfur (insoluble sulfur) as well as, if necessary, chemicals such as carbon black and silica as a reinforcing filler, a process oil, an antioxidant, zinc oxide, stearic acid, a resin and the like which are used usually in the rubber industry.

A content of the vulcanizing agent such as sulfur (insoluble sulfur) is preferably 0.1 to 10.0 parts by mass, more preferably 1.0 to 5.0 parts by mass based on 100 parts by mass of the rubber component.

The carbon black which can be used as the reinforcing filler described above shall not specifically be restricted, and carbon blacks having a higher reinforcing power than that of than HAF (N330) are preferably contained in the rubber composition.

In the present invention, the carbon blacks having a higher reinforcing power than that of HAF (N330) carbon blacks in which a specific surface area ($m^2/g$) evaluated by an iodine adsorption amount, a DBP adsorption amount and the like is equal to or larger than that of HAF carbon black and mean carbon blacks in which an effect of enhancing an elastic modulus and a rapture strength when it is blended with the rubber composition is equal to or larger than that of HAF carbon black.

Among the carbon blacks higher than N330, preferred are N335, N339, N343, N347, N351, N356, N358, N375, N220 and N234, and N330, N335, N339, N343, N347 and N220 are particularly preferred.

The rubber composition which can attain a higher rapture strength and a higher heat resistance is obtained by using the carbon blacks higher than HAF (N330).

A content of the above carbon blacks is preferably 30 to 60 parts by mass, more preferably 30 to 50 parts by mass based on 100 parts by mass of the rubber component.

If a content of the above carbon blacks is less than 30 parts by mass, the mechanical strength is unsatisfactory. On the other hand, if the content of the above carbon blacks exceeds 60 parts by mass, exothermic property is deteriorated, or a rise in the viscosity in unvulcanization and a reduction in the adhesive property are brought about, and the problems of the poor followability onto irregularities of the buffed surface and the inferior adhesion in unvulcanization are caused in a certain case.

When the rubber composition of the present invention is applied to a retreaded tire, the above rubber composition can suitably be used for a cushion rubber provided between a tire casing and a pre-cure tread rubber for retreading. In the present case, the tire casing and the pre-cure tread rubber for retreading are adhered via the cushion rubber, and then they are integrally vulcanized. In this connection, the rubbers are vulcanized at a vulcanizing temperature of preferably 120° C. or lower, more preferably 100 to 120° C. If the temperature falls in the above ranges, a tire casing in vulcanization can be inhibited from being excessively vulcanized, and tires can be produced at a practical vulcanizing time in commercial production.

Further, when the rubber composition of the present invention is applied to tires produced by adhering separately vulcanized rubber members, the rubber composition can suitably be applied to adhesion carried out by interposing the rubber composition between the vulcanized rubber members and covulcanizing rubber members. In the above case, the rubber composition is interposed between the vulcanized rubber members to covulcanize rubber members, and the vulcanized rubber members have to be prevented from excessive vulcanization. In the above case, the rubbers are vulcanized at a vulcanizing temperature of preferably 120° C. or lower, more preferably 100 to 120° C. If the temperature falls in the above ranges, the rubber members can be inhibited from excessive vulcanization, and retreaded tires can be produced at a practical vulcanizing time in commercial production.

In the rubber composition of the present invention constituted as described above, added are 0.3 to 2.5 parts by mass of the aldehydeamines, 0.1 to 1.5 part by mass of at least one compound selected from tetra(2-ethylhexyl)thiuram disulfide, 1,6-bis(N,N'-dibenzylthiocarbamoyldithio)-hexane and 1,6-bis{N,N'-di(2-ethylhexyl)thiocarbamoyldithio}-hexane, and 0.1 to 2.5 parts by mass of the thiazole type vulcanization accelerator based on 100 parts by mass of the rubber component, whereby having antinomies high vulcanization maximum torque (Fmax value) showing which indicates a high cross-linking degree at a temperature close to 100° C. and slow vulcanizing rate at T0.1, at which curing the rubber is initiated (longer time) in contrast to fast vulcanizing rate at T0.9 which is the terminal stage for vulcanization of the rubber (shorter time) can be made highly compatible with each other in a cushion rubber of a retreaded tire, or a rubber for adhesion carried out by interposing the rubber composition between vulcanized rubber members and covulcanizing rubber members in a tire prepared by adhering separately vulcanized rubber members, and the rubber composition making it possible to produce a tire which is excellent in a productivity is obtained.

In contrast thereto, when guanidines shown in the examples of JP 2002-356102A (patent document 1) which is a conventional art are used as amines instead of the aldehydeamines used in the present invention, an effect of accelerating the vulcanizing rate at T0.9 is lower than that of the aldehydeamines, and use thereof in a large amount in order to increase the effect makes the vulcanizing rate at T0.1 too large to result in deteriorating the scorch property (this matter shall be explained in detail in comparative examples and the like described later).

In the present invention, added are the foregoing three kinds of 0.3 to 2.5 parts by mass of the aldehydeamines, 0.1 to 1.5 part by mass of at least one compound selected from tetra(2-ethylhexyl)thiuram disulfide, 1,6-bis(N,N'-dibenzylthiocarbamoyldithio)-hexane and 1,6-bis{N,N'-di(2-ethylhexyl)thiocarbamoyldithio}-hexane, and 0.1 to 2.5 parts by mass of the thiazole type vulcanization accelerator, whereby first obtained is the rubber composition which is excellent in a productivity due to a high cross-linking degree at a temperature close to 100° C., a reduction in a vulcanizing time and a scorch resistance (prevention of curing caused by heating in processing).

The essential point of the tire in the present invention resides in that the rubber composition constituted as described above is used for a cushion rubber of a tire for retreading, that is, a cushion rubber for adhering a retreaded tread rubber and a retreaded tire casing, and structures other than those described above shall not specifically be restricted.

The tire of the present invention makes it possible to enhance a productivity of the retreaded tires without damaging the tire performances thereof. Also, the rubber composition of the present invention is applied to a rubber for adhesion carried out by interposing the rubber composition between vulcanized rubber members and covulcanizing rubber members in a tire prepared by adhering separately vulcanized rubber members, whereby the productivity can be enhanced without damaging the tire performances.

EXAMPLES

Next, the present invention shall be explained in further details with reference to examples and comparative examples, but the present invention shall by no means be restricted to the following examples.

Examples 1 to 14 and Comparative Examples 1 to 10

Rubber compositions having blend formulations shown in following Tables 1 and 2 were prepared. The respective rubber compositions obtained were used to measure a vulcanization maximum torque (Fmax value) and vulcanizing times T0.9 and T0.1 by the following methods.

The examples shown below are merely examples, and various blend ingredients for rubbers including a reinforcing filler such as silica, a tackifier and a softening agent (process oil) which are usually used shall not be restricted in use thereof.

The examples shown below are merely examples, and various blend ingredients for rubbers including a reinforcing filler such as silica, a tackifier and a softening agent (process oil) which are usually used shall not be restricted in use thereof.

Measuring Method of Vulcanization Maximum Torque (Fmax Value):

A maximum value in a vulcanization torque curve measured at a temperature of 105±1° C. according to JIS K6300-2 was measured. The above vulcanization maximum torque: Fmax value shows an indicator of a cross-linking degree at 105° C.

Measuring Method of Vulcanizing Time T0.9:

Time (minutes) required for obtaining 90% of the maximum value in the vulcanization torque curve measured at a temperature of 105±1° C. according to JIS K6300-2 was measured. The above vulcanizing rate T0.9 is an indicator of a vulcanizing time at which vulcanization of the rubber is almost finished, and it is shown that the small the value is, the larger the vulcanizing rate is.

Measuring Method of Vulcanizing Time T0.1

Time (minutes) required for obtaining 10% of the maximum value in the vulcanization torque curve measured at a temperature of 105±1° C. according to JIS K6300-2 was measured. The above vulcanizing time T0.1 is an indicator indicating a scorch resistance, and it is shown that the small the value is, the shorter the induction period passing until the cross-linking reaction initiates is, and the more readily the rubber is scorched (the scorch resistance is more deteriorated).

TABLE 1

| | | Example | | | | | | | | | | | | | | |
|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 |
| Blend component | Natural rubber | 100 | 100 | 100 | 100 | 100 | 100 | 100 | 100 | 100 | 100 | 100 | 100 | 100 | 100 |
| | Carbon black (N339) | 35 | 35 | 35 | 35 | 35 | 35 | 35 | 35 | 35 | 35 | 35 | 35 | 35 | 35 |
| | Stearic acid | 2.0 | 2.0 | 2.0 | 2.0 | 2.0 | 2.0 | 2.0 | 2.0 | 2.0 | 2.0 | 2.0 | 2.0 | 2.0 | 2.0 |
| | Zinc oxide | 3.0 | 3.0 | 3.0 | 3.0 | 3.0 | 3.0 | 3.0 | 3.0 | 3.0 | 3.0 | 3.0 | 3.0 | 3.0 | 3.0 |
| | Anti-aging agent(6C) *1 | 1.0 | 1.0 | 1.0 | 1.0 | 1.0 | 1.0 | 1.0 | 1.0 | 1.0 | 1.0 | 1.0 | 1.0 | 1.0 | 1.0 |
| | Anti-aging agent(RD) *2 | 2.0 | 2.0 | 2.0 | 2.0 | 2.0 | 2.0 | 2.0 | 2.0 | 2.0 | 2.0 | 2.0 | 2.0 | 2.0 | 2.0 |
| | Sulfur (insoluble sulfur) | 3.0 | 3.0 | 3.0 | 3.0 | 3.0 | 3.0 | 3.0 | 3.0 | 3.0 | 3.0 | 3.0 | 3.0 | 3.0 | 3.0 |
| | Process oil (TDAE) *3 | 20 | 20 | 20 | 20 | 20 | 20 | 20 | 20 | 20 | 20 | 20 | 20 | 20 | 20 |
| | Phenol resin *4 | 2.0 | 2.0 | 2.0 | 2.0 | 2.0 | 2.0 | 2.0 | 2.0 | 2.0 | 2.0 | 2.0 | 2.0 | 2.0 | 2.0 |
| Vulcanization accelerator | BAA1 *5 | 0.7 | 1.8 | 1.3 | 1.6 | 0.6 | 0.7 | — | 1.3 | 1.3 | 0.3 | 2.3 | 1.8 | 0.5 | 0.5 |
| | BAA2 *6 | — | — | — | — | — | — | 1.3 | — | — | — | — | — | — | — |
| | DM *7 | 1.0 | 1.0 | 1.0 | 0.7 | 1.8 | 0.7 | 1.0 | 1.0 | 1.0 | 1.2 | 0.5 | 0.2 | 2.3 | 0.6 |
| | TOT *8 | 0.4 | 0.2 | 0.3 | 0.3 | 0.6 | 0.8 | 0.3 | — | — | 0.6 | 0.2 | 0.4 | 0.2 | 1.2 |
| | KA9188 *9 | — | — | — | — | — | — | — | 0.2 | — | — | — | — | — | — |
| | HDC *10 | — | — | — | — | — | — | — | — | 0.4 | — | — | — | — | — |
| 105° C., vulcanization maximum torque Fmax [dn · m] | | 9.1 | 10.0 | 9.6 | 10.1 | 10.6 | 10.4 | 9.8 | 9.5 | 10.2 | 9.2 | 10.1 | 8.9 | 11.5 | 14.2 |
| 105° C., vulcanizing rate T0.1 (minutes) | | 13.2 | 10.7 | 13.0 | 11.9 | 9.5 | 12.2 | 13.2 | 13.4 | 11.5 | 15.5 | 8.2 | 8.9 | 14.0 | 16.0 |
| 105° C., vulcanizing rate T0.9 (minutes) | | 45 | 47 | 49 | 48 | 46 | 53 | 49 | 50 | 46 | 69 | 47 | 57 | 67 | 68 |

TABLE 2

| | | Comparative Example | | | | | | | | | |
|---|---|---|---|---|---|---|---|---|---|---|---|
| | | 1 | 2 | 3 | 4 | 5 | 6 | 7 | 8 | 9 | 10 |
| Blend component | Natural rubber | 100 | 100 | 100 | 100 | 100 | 100 | 100 | 100 | 100 | 100 |
| | Carbon black (N339) | 35 | 35 | 35 | 35 | 35 | 35 | 35 | 35 | 35 | 35 |
| | Stearic acid | 2.0 | 2.0 | 2.0 | 2.0 | 2.0 | 2.0 | 2.0 | 2.0 | 2.0 | 2.0 |
| | Zinc oxide | 3.0 | 3.0 | 3.0 | 3.0 | 3.0 | 3.0 | 3.0 | 3.0 | 3.0 | 3.0 |
| | Anti-aging agent(6C) *1 | 1.0 | 1.0 | 1.0 | 1.0 | 1.0 | 1.0 | 1.0 | 1.0 | 1.0 | 1.0 |
| | Anti-aging agent(RD) *2 | 2.0 | 2.0 | 2.0 | 2.0 | 2.0 | 2.0 | 2.0 | 2.0 | 2.0 | 2.0 |
| | Sulfur (insoluble sulfur) | 3.0 | 3.0 | 3.0 | 3.0 | 3.0 | 3.0 | 3.0 | 3.0 | 3.0 | 3.0 |
| | Process oil (TDAE) *3 | 20 | 20 | 20 | 20 | 20 | 20 | 20 | 20 | 20 | 20 |
| | Phenol resin *4 | 2.0 | 2.0 | 2.0 | 2.0 | 2.0 | 2.0 | 2.0 | 2.0 | 2.0 | 2.0 |
| Vulcanization accelerator | BAA1 *5 | — | — | — | — | — | 1.9 | 2.5 | — | 1.6 | 0.6 |
| | DPG *11 | 1.3 | 1.8 | 0.7 | 0.4 | — | — | — | 2.5 | — | — |
| | DM *8 | 0.7 | 0.7 | 1.0 | 0.2 | 1.5 | — | 2.5 | 2.5 | 0.7 | 1.8 |
| | TOT *9 | 0.3 | 0.2 | 0.3 | 0.6 | 1.4 | 0.5 | — | | | |
| | TBZTD *12 | — | — | — | — | — | — | — | — | 0.2 | 0.4 |
| 105° C., vulcanization maximum torque Fmax [dn · m] | | 10.0 | 10.4 | 9.7 | 9.4 | 9.8 | 8.1 | 14.5 | 14.2 | 11.4 | 12.0 |
| 105° C., vulcanizing rate T0.1 (minutes) | | 4.8 | 3.9 | 5.0 | 8.0 | 20.7 | 9.4 | 28.0 | 25.2 | 6.6 | 5.1 |
| 105° C., vulcanizing rate T0.9 (minutes) | | 50 | 48 | 54 | 66 | 115 | 74 | 153 | 160 | 44 | 40 |

Abbreviated codes of *1 to *12 shown in Tables 1 and 2 are explained below.

*1: N-(1,3-dimethylbutyl)-N'-phenyl-p-phenylenediamine
 (Nocrac 6C, manufactured by Ouchi Shinko Chemical Industrial Co., Ltd.)

*2: Polymerized 2,2,4-trimethyl-1,2-dihydroquinoline: TMDQ
 (Nocrac 224, manufactured by Ouchi Shinko Chemical Industrial Co., Ltd.)

*3: TDAE: Treated Distilled Aromatic Extracts

*4: alkylphenol formaldehyde resin (R7521P, manufactured by SI GROUP-REBECOURT SAS)

*5: BAA1: n-butylaldehyde-aniline condensation product
 (Nocceler 8, manufactured by Ouchi Shinko Chemical Industrial Co., Ltd.)

*6: BAA2: n-butylaldehyde-aniline condensation product
 (A40B, manufactured by Akrochem Corporation)

*7: DM: dibenzothiazyldisulfide
 (Nocceler DM, manufactured by Ouchi Shinko Chemical Industrial Co., Ltd.)

*8: TOT: 33% silica supported tetra(2-ethylhexyl)thiuram disulfide
 (Nocceler TOT-N, silica/TOT=3, manufactured by Ouchi Shinko Chemical Industrial Co., Ltd.)

*9: KA9188: 1,6-bis(N,N'-dibenzylthiocarbamoyldithio)-hexane
 (VULCUREN KA9188, manufactured by Lanxess AG)

*10: HDC: 1,6-bis{N,N'-di(2-ethylhexyl)thiocarbamoyldithio}-hexane

*11: DPG: diphenylguanidine (Nocceler D, manufactured by Ouchi Shinko Chemical Industrial Co., Ltd.)

*12: TBZTD: tetrabenzylthiuram disulfide

As apparent from the results shown in Tables 1 and 2, it has become clear that in the rubber compositions prepared in Examples 1 to 14 falling in the scope of the present invention as compared with the rubber compositions prepared in Comparative Examples 1 to 10 falling outside the scope of the present invention, having antinomies, high vulcanization maximum torque (Fmax value) which indicates a high cross-linking degree at a temperature close to 100° C. and slow vulcanizing rate at T0.1, at which curing of the rubber is initiated (longer time) in contrast to fast vulcanizing rate at T0.9 which is the terminal stage of the vulcanization (shorter time) can be made highly compatible with each other.

On the other hand, to individually examine the comparative examples falling outside the scope of the present invention, in Comparative Examples 1 to 4, three kinds of vulcanization accelerators of diphenylguanidine (DPG), the thiazole type accelerator (DM) and tetra(2-ethylhexyl)thiuram disulfide (TOT) were combined; in Comparative Example 5, two kinds of vulcanization accelerators of the thiazole type accelerator (DM) and tetra(2-ethylhexyl)thiuram disulfide (TOT) were combined; in Comparative Example 6, two kinds of vulcanization accelerators of the aldehydeamines (BAA) and tetra(2-ethylhexyl)thiuram disulfide (TOT) were combined; in Comparative Example 7, two kinds of vulcanization accelerators of the aldehydeamines (BAA) and the thiazole type accelerator (DM) were combined; in Comparative Example 8, two kinds of vulcanization accelerators of diphenylguanidine (DPG) and the thiazole type accelerator (DM) were combined; and in Comparative Examples 9 and 10, three kinds of vulcanization accelerators of the aldehydeamines (BAA), the thiazole type accelerator (DM) and tetrabenzylthiuram disulfide (TBZTD) were combined. It has been found that the effects of the present invention cannot be exerted in the above comparative examples.

Also, in Examples 1 to 6 and Comparative Examples 1 to 4, the aldehydeamines (BAA) were compared with diphenylguanidine (DPG) based on the combination of two kinds of the vulcanization accelerators of the thiazole type accelerator (DM) and tetra(2-ethylhexyl)thiuram disulfide (TOT), and the vulcanizing rate at T0.1 was accelerated too much to result in deteriorating the scorch property.

Further, in Comparative Examples 9 and 10, the aldehydeamines (BAA), the thiazole type vulcanization accelerator (DM) and tetrabenzylthiuram disulfide (TBZTD) were combined as shown in the example (composition 1.5) of JP 1996-59898A (patent document 2) which is a conventional art. Also in the above comparative examples, the vulcanizing rate at T0.1 was accelerated too much to result in deteriorating the scorch property.

Accordingly, as apparent from the results obtained in Examples 1 to 14 and Comparative Examples 1 to 10, it has become clear that obtained is the rubber composition which is excellent in a productivity due to a high cross-linking degree at a temperature close to 100° C., a reduction in a vulcanizing time and a scorch resistance (prevention of curing caused by heating in processing).

Also, applying of the rubber compositions prepared in Examples 1 to 14 to the cushion rubbers of retreaded tires and applying thereof to a rubber for adhesion carried out by interposing it between vulcanized rubber members and covulcanizing them in a tire prepared by adhering separately vulcanized rubber members make it possible to enhance the productivity without damaging the tire performances.

The invention claimed is:

1. A scorch resistant rubber composition comprising:
   0.3 to 2.5 parts by mass of aldehydeamines;
   0.1 to 1.5 part by mass of tetra(2-ethylhexyl)thiuram disulfide;
   0.1 to 2.5 parts by mass of a thiazole vulcanization accelerator; and
   30 to 60 parts by mass of carbon black,
   based on 100 parts by mass of a rubber component.

2. The scorch resistant rubber composition as described in claim 1, wherein the rubber composition is vulcanized at a vulcanizing temperature of 120° C. or lower.

3. The scorch resistant rubber composition as described in claim 1, wherein the rubber composition is used for a cushion rubber of a retreaded tire.

4. A tire produced by using the scorch resistant rubber composition as described in claim 1 for a cushion rubber of a retreaded tire.

5. A pneumatic tire produced by interposing the scorch resistant rubber composition as described in claim 1 between vulcanized rubber members and covulcanizing rubber members to thereby adhere rubber members.

* * * * *